1

2,956,893

PERLITE INSULATION MATERIAL

Harry H. Houston, Elmhurst, Ill., and Louis S. McCollum, North Hollywood, Calif., assignors to International Minerals & Chemical Corporation, a corporation of New York No Drawing. Filed Oct. 28, 1957, Ser. No. 692,589

12 Claims. (Cl. 106—67)

This invention relates to a novel lightweight insulating material. More particularly, this invention relates to a novel insulating material comprised of expanded perlite, clay, and a flux.

Heretofore, insulating bricks suitable for the backing of refractory bricks in high temperature furnaces have been prepared from diatomaceous earth. In one method of preparing this type of insulating brick, diatomaceous earth and a suitable binder are mixed in a pug mill or other mixing equipment and the mixture is pressed into molds or extruded to form bricks. The molded bricks are then heated to incipient fusion in a suitable furnace and allowed to cool.

Expanded perlite has been used as a low temperature thermal insulating material for many years. Because expanded perlite is highly porous and lightweight, it has found use as a loose-fill insulation material, as a component of thermal insulating plaster board, and the like. However, expanded perlite is extremely friable, and when it is subjected to a mechanical mixing step such as a pug mill or the like, the porous perlitic structure is broken down, thereby adversely affecting the inherent insulating characteristics of the expanded perlite.

It is a primary object of this invention to provide a novel lightweight thermal insulating material containing expanded perlite.

It is another object to provide a method of preparing a lightweight thermal insulating material from expanded perlite without substantial destruction of the cellular structure of the expanded perlite.

Another object of this invention is to provide a method of preparing back-up insulating brick from expanded perlite without destroying the cellular structure of expanded perlite.

These and other objects and advantages of the invention will be readily apparent from the following detailed description.

Now it has been discovered that a novel lightweight thermal insulating material suitable for backing-up refractory brick in high temperature furnaces and the like can be prepared by slurrying expanded perlite, clay, and a flux with water to form a substantially homogeneous slurry, filtering the slurry, and firing the moist filter cake at a temperature between about 1400 and about 1750° F.

More in detail, fine expanded perlite particles having a diameter between about 5 and about 200 microns are preferably used to prepare the novel insulating material, but coarser or finer particles may be used if desired. Such particles are formed in various processes for expanding or "popping" perlite to produce light-weight aggregates, filter aids, and the like. For example, perlite ore may be crushed to pass through a screen of about 4 mesh and sized at about 45 mesh to recover a —4 +45 mesh fraction and a —45 mesh fraction. The —4 +45 mesh perlite particles are expanded by heating to a temperature between about 1500° F. and about 2100° F. in a vertical shaft furnace or other expansion furnace used by the perlite industry. Expanded perlite from the expansion furnace is subjected to a size separation step in a cyclone separator or other air classification apparatus. Coarse particles from the sizing step are suitable for use as a light weight aggregate in plaster, concrete, and the like. Fine particles from the sizing step, substantially all of which are less than about 175 microns in diameter, are suitable for use in the preparation of the instant novel insulating material.

In the production of filter aid from perlite, the —45 mesh perlite particles from the above-mentioned sizing step are expanded as described above. Expanded perlite from the furnace may be comminuted and sized by air classification or the like. Coarse, comminuted, expanded perlite from this sizing step is suitable for use as a filter aid. Fine expanded comminuted perlite from this sizing step, substantially all of which is less than about 175 microns in diameter, is suitable for use as a component of the novel insulating material.

While two methods of preparing fine expanded perlite have been described, expanded perlite fines prepared by other processes may also be used as a component of the novel insulating material. If desired, expanded perlite having a particle size of the order of about —45 +100 mesh, such as the filter aid material prepared as described above, may also be used as a component of the novel insulating material. An acidic activated bentonite clay is preferably used as a component of the novel insulating material, but any naturally activated or synthetically activated clay of the non-swelling montmorillonite variety may be used. Bentonite clay mined in the vicinity of Olancha, California which has been admixed with an aqueous aluminum sulfate solution and heated to a temperature of about 450° F., for example, in a suitable heating apparatus such as a rotary kiln has been found to be particularly suitable as a component of the novel insulating material. It is preferred to use clay particles all of which have a diameter less than about 100 microns, but coarser or finer particles may be used if desired.

The acidity of the clay is preferably sufficient to form a slurry having a pH of between about 4 and about 6, and preferably between about 4.5 and about 5.5, when a slurry is prepared by mixing 2 grams of clay with 10 ml. of water. The presence of a bentonite clay of this type in the mixture used to prepare the novel insulating material is believed to accelerate filtration of the slurry and to improve cohesion of the solid material after filtration and drying.

A small amount of a suitable flux is also used in preparing the novel insulation material. Any substance which fuses and forms a glass at temperatures between about 1400 to 1750° F. may be used. Compounds which are suitable for a flux include calcium metaphosphate, boron phosphate, phosphoric acid, anhydrous phosphorus pentoxide, boron oxide, and the like. When the mixture containing the flux is fired as described more fully hereinafter, the flux fuses and forms a glass which serves as a binder for the solid particles in the mixture, thereby increasing the strength of the insulating body.

An organic binder is optionally added in small amounts to the mixture in order to give improved green strength to the insulating bodies prior to firing. Organic materials which may be used as a binder include starch, dextrin, soya flour, casein, carboxymethylcellulose, alkali metal salts of carboxymethylcellulose, and the like.

The following table sets forth the amounts of solid materials in terms of percent by weight on a dry basis that are used in the preparation of the novel insulating material.

TABLE I

| Component | Percent by Weight on a Dry Basis | |
|---|---|---|
| | Preferred Range | Range |
| Expanded perlite | 80–85 | 70–85 |
| Clay | 12–15 | 10–20 |
| Flux | 2.5–5 | 2–10 |
| Binder | 2.5–5 | 0–8 |

Solid materials in the above-mentioned proportions are slurried and commingled with water in a suitable container provided with agitation means. For example, a conventional cylindrical tank provided with a mechanical stirrer is used to prepare the slurry. In a preferred embodiment of the invention, water is added to the container and agitated prior to the addition of the solid materials. Solid materials are then added in the above-mentioned proportions to the water in sufficient quantity to form a slurry of between about 10 and about 40% solids by weight, and preferably between about 15 and about 25%. The mixture of water and solid materials is agitated to form a substantially homogeneous slurry. Generally, the time required to produce adequate mixing of the solids and water is between about 5 and about 20 minutes, but lesser or greater times may be used depending upon the solids content of the slurry. Generally, longer time periods are necessary to accomplish adequate mixing when the solids content of the slurry is above about 35% by weight. If desired, water and solid materials may be added simultaneously to the container; and after agitation to form a substantially homogeneous slurry, a portion of the slurry equivalent to the amount added as water and solid is continuously withdrawn. Regardless of whether the slurry is prepared batchwise or on a continuous basis, water should always be present in the container when the solids are added, and at no time should the mechanical stirrer come in contact with the dry solids. When the slurry is prepared in this manner, there is substantially no deterioration of the cellular structure of expanded perlite in the mixture.

The homogeneous slurry is filtered in a suitable filtration apparatus such as a pan filter. If desired, the slurry may be filtered in a mold having a filter medium base, the dimensions of the mold being equivalent to the size of the brick desired. For example, a mold having a length of about 6", a width of about 3½", a height of about 2", and a filter medium base can be used to prepare bricks having dimensions substantially equivalent to that of the mold. The bricks are prepared by filtering the homogeneous slurry in the filter mold. Because of the porous nature of the expanded perlite particles in the slurry, the filtration rate is extremely high and is generally on the order of between about 15 and about 30 gallons per hour per square foot of filter area.

The moist filter cake, which may be in the shape of a layer in the case of the pan filter, or in the shape of a brick in the case of the filter mold, is removed from the filter. When an organic binder is present in the moist filter cake, the solids have a high green strength and have good handling properties. However, when there is no organic binder present in the moist filter cake, the solids can still be handled satisfactorily. The moist filter cakes are preferably dried in a suitable furnace at a temperature between about 200° F. and about 240° F. Because of the porous nature of the expanded perlite in the filter cakes or bricks, the solid forms have a relatively high drying rate without substantial shrinkage or deterioration. After drying, the solid forms may be cut or trimmed into desired shapes. Solid forms prepared in this manner are then placed in a suitable furnace and heated to a temperature between about 1400 and about 1750° F. for between about 1 and 2 hours. Firing of the shapes or bricks in this manner causes the flux to fuse and form a glass which serves as a binder for the other solid components in the brick. Any organic binder present in the solid mass is volatilized and driven off during the firing step.

If the moist filter cake is already in the desired form, for example, in the shape of a brick, the drying and firing steps may be carried out in one furnace. However, when this is done, the moist filter cake should be heated slowly to reach the firing temperature in order to prevent excessive cracking in the mold when moisture is driven off. For this reason, the moist filter cake should be heated from ambient temperature to the firing temperature at a rate not in excess of about 5° F. per minute, and preferably between about 2 and about 3° F. per minute.

After firing, the novel insulating material in the form of bricks or other desirable shapes are cooled to ambient temperature. Novel insulating bricks prepared in this manner contain expanded perlite substantially all of which is in an unfragmented form, viz., the cellular structure of the expanded perlite is substantially unchanged in the final product as compared to the expanded perlite used as a feed material. The novel insulating material may have a density as low as 6 pounds per cubic foot and can withstand exposure to temperatures as high as about 1600° F. for extended periods. The heat transfer coefficient of the novel lightweight insulating material is equal to or less than conventional back-up brick prepared from diatomaceous earth. Novel lightweight insulating bricks prepared in accordance with the instant invention can be used as back-up brick in high temperature refractory furnaces and the like.

As illustrative of the character of the instant invention, but in no way intended to be limited thereto, the following example is described.

Example

Expanded comminuted perlite was prepared by heating crushed perlite ore in a vertical expansion furnace at a temperature of about 1600° F. to cause expansion of the perlite. After expansion, the expanded particles were comminuted and subjected to a size separation in a cyclone separator. The approximate particle size of the expanded perlite recovered from the cyclone was between about 80 mesh and about 325 mesh.

An acidic activated bentonite clay was prepared by admixing bentonite clay, mined in the vicinity of Olancha, California, with an aqueous aluminum sulfate solution in an amount equivalent to about 4% $Al_2(SO_4)_3$, based on the combined weight of aluminum sulfate and clay. The mixture of clay and aluminum sulfate was then heated to a temperature of about 450° F. The pH of the slurry prepared by admixing one gram of activated clay with 5 ml. of water was 4.6. Expanded perlite prepared as described above (80 parts), acidic activated bentonite clay prepared as described above (15 parts), carboxymethylcellulose (2.5 parts), and calcium metaphosphate (5 parts) were added to 300 parts of water in a cylindrical container provided with a mechanical stirrer. The mixture was agitated for about 10 minutes to form a substantially homogeneous slurry. The slurry was filtered and the moist filter cake produced thereby was then heated overnight at a temperature of about 220° F. The dried filter cake was fired at a temperature of about 1700° F. for about one hour. The thermal insulating brick prepared in this manner had a density of about six pounds per cubic foot and a heat transfer coefficient equivalent to that of a back-up insulation brick prepared from diatomaceous earth.

Having now thus fully described and illustrated this invention, what is desired to be secured by Letters Patent is:

1. A thermal insulating material capable of withstanding temperatures up to about 1600° F. without substantial deterioration, consisting essentially of unfragmented expanded perlite and bentonite firmly bound together with an inorganic glass selected from the group consisting of boron-containing glass, phosphate-containing glass and mixtures thereof, said perlite comprising between about 70 and about 85%, said bentonite comprising between about 10 and about 20%, and said inorganic glass comprising between about 2 and about 10% by weight of the material.

2. The insulating material of claim 1 wherein said bentonite is an acidic non-swelling bentonite.

3. The insulating material of claim 1 wherein said inorganic glass is calcium metaphosphate.

4. The method of preparing a thermal insulating material which comprises the steps of forming a substantially homogeneous aqueous slurry by commingling water, expanded perlite, bentonite clay and an inorganic flux capable of fusing and forminig a glass at firing temperatures subsequently employed, the solids content of said slurry consisting essentially of between about 70 and about 85% of said perlite, between about 10 and about 20% of said clay, and between about 2 and about 10% of said flux by weight, filtering said slurry, recovering a moist filter cake, and firing said filter cake at a temperature within the range between about 1400 and about 1750° F., whereby moisture is volatilized and whereby said flux fuses and forms a glass-like binder for said clay in the filter cake.

5. The method of claim 4 wherein the solids content of said slurry is between about 10 and about 40% by weight.

6. The method of claim 4 wherein said flux is calcium metaphosphate.

7. The method of preparing a thermal insulating material which comprises the steps of forming a substantially homogeneous aqueous slurry by commingling water, expanded perlite, bentonite clay, an organic binder and an inorganic flux capable of fusing and forming a glass at the temperature conditions subsequently employed, the solids content of said slurry consisting essentially of between about 70 and about 85% of said perlite, between about 10 and about 20% of said clay, between about 2.5 and about 8% of said organic binder, and between about 2 and about 10% of said flux, filtering said slurry, recovering a moist filter cake, and firing said filter cake at a temperature within the range between about 1400 and about 1750° F., whereby moisture and said organic binder are volatilized, and whereby said flux fuses and forms a glassy binder for said perlite and said clay in the filter cake.

8. The method of claim 7 wherein the solids content of said slurry is between about 10 and about 40% by weight.

9. The method of claim 7 wherein said organic binder is carboxymethylcellulose.

10. The method of claim 7 wherein said flux is calcium metaphosphate.

11. The method of preparing a thermal insulating material which comprises the steps of commingling expanded perlite having a particle size between about 5 and about 175 microns, an acidic non-swelling bentonite clay, calcium metaphosphate and carboxymethylcellulose with a sufficient quantity of water to form a substantially homogeneous slurry, the solids content of said slurry consisting essentially of between about 70 and about 85% of said perlite, between about 10 and about 20% of said bentonite, between about 2 and about 10% of calcium metaphosphate, and between about 2.5 and about 8% of carboxymethylcellulose by weight, filtering said slurry, recovering a moist filter cake, and firing said filter cake at a temperature within the range between about 1400 and about 1750° F., whereby water and carboxymethylcellulose are volatilized, and whereby calcium metaphosphate fuses and forms a glassy binder for said perlite and said clay in the filter cake.

12. The method of claim 11 wherein the solids content of said slurry is between about 10 and about 40% by weight.

References Cited in the file of this patent

UNITED STATES PATENTS

| | | |
|---|---|---|
| 2,388,060 | Hicks | Oct. 30, 1945 |
| 2,419,290 | Schaefer | Apr. 22, 1947 |
| 2,487,207 | Adams | Nov. 8, 1949 |
| 2,526,073 | Gardner | Oct. 17, 1950 |